United States Patent Office 3,141,441
Patented July 21, 1964

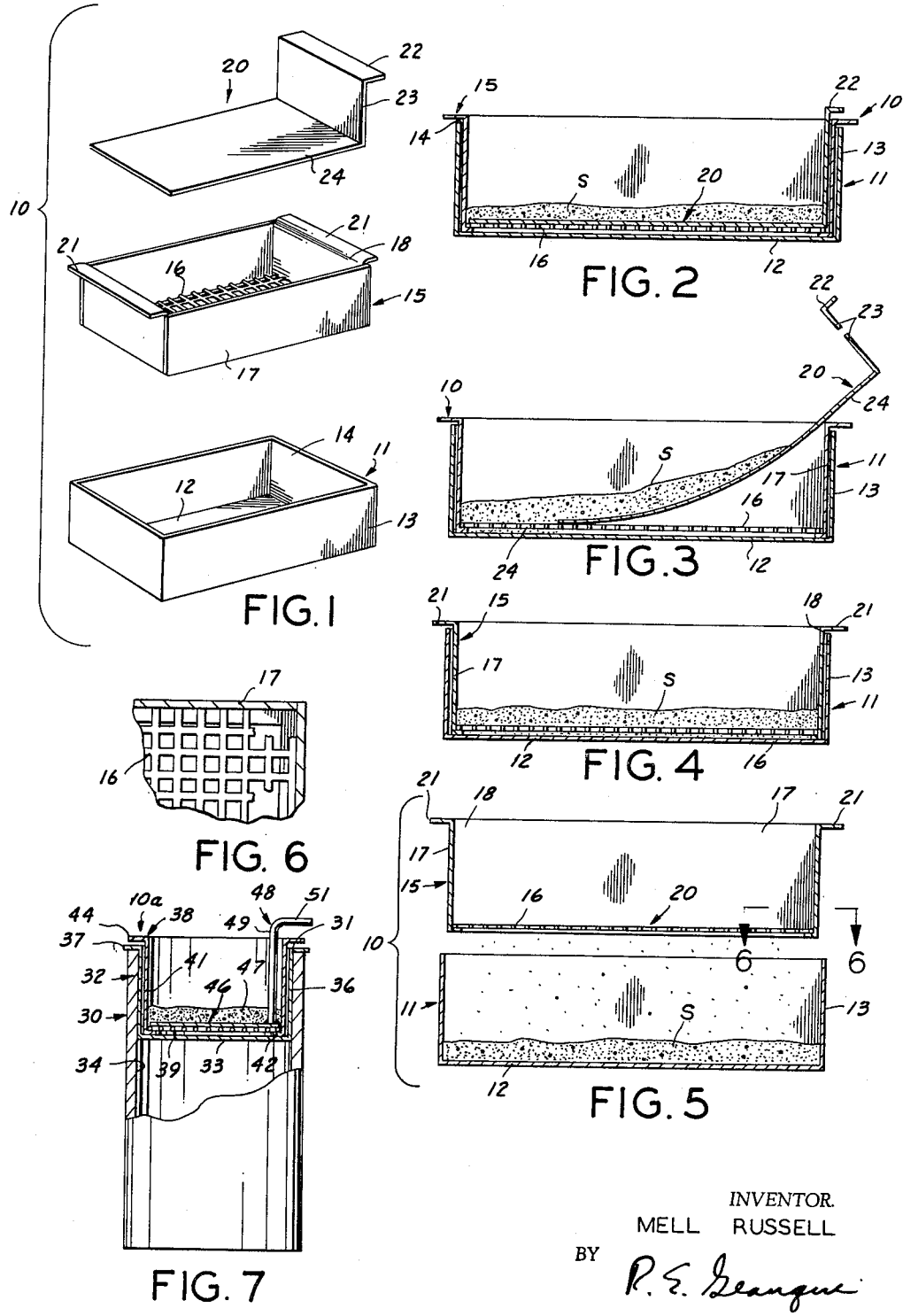

3,141,441
SANITARY RECEPTACLE
Mell Russell, 9743 Tujunga Canyon Blvd., Tujunga, Calif.
Filed Apr. 23, 1962, Ser. No. 189,426
5 Claims. (Cl. 119—1)

This invention relates to a sanitary receptacle and more particularly to a new and improved receptacle particularly useful for collecting waste material in a granular substance, such as sand or any of the prepared granular substances comprising a sanitizing, deodorizing, and absorbent type of material whereby the waste material may be easily and readily sifted from the granular material for disposal while the granular material itself is retained in the receptacle.

More specifically, this invention relates to a sanitary receptacle useable as an indoor commode for collecting the excrement of pets, particularly that of cats, and frequently referred to as cat sand boxes. The receptacle is adapted to contain a granular material commonly provided for use in indoor pet boxes for the purpose of sanitizing and deodorizing the excrement of the animal. Such granular material becomes periodically spent and needs frequent attention to remove the waste product deposited by the animal in the material so as not to overcome the absorbing and deodorizing qualities of the granular material. The granular material may comprise any coarse ground material of mineral or vegetable origin or may comprise common granulated sand.

Although indoor sand boxes are cleanable by using a small sieve for separating the waste material from the sand, it is preferable, and therefore an object of this invention, to provide a receptacle having a screen construction in which the entire quantity of sand in the box is quickly, readily, and thoroughly screened by a separator capable of processing the entire quantity of sand in a minimum of operations and wherein the sand is replaced in the receptacle in a cleaned and reuseable condition.

This invention further provides a new and improved sanitary receptacle which is useable in its assembled condition for containing the sand or other granular material and has its component parts so assembled so as to screen the unwanted waste particles deposited in the sand material while disassembling the receptacle and wherein the receptacle is easily and readily reassembled without the necessity for removing the granular material, per se.

This invention is also adaptable for use in sanitary receptacles intended for deposit of cigarette and cigar butts, ashes or other wet or dry waste material normally deposited in such receptacles and in which granular material, such as sand, is normally employed. In such an environment, the receptacle is preferably removably supported in a pedestal, or other base, so as to elevate the receptacle and is adapted to contain a quantity of the granular material. The waste products deposited in the receptacle are periodically removable from the sand for disposal thereof by disassembling the assembled component parts of the receptacle to screen the waste material without removing the sand. The receptacle can be subsequently reassembled without the necessity for direct handling of the sand to place the receptacle in a condition for reuse.

A principal object of this invention is to provide a sanitary receptacle useable indoors for deposit of excrements or other waste products of an animal whereby the waste products may be easily and readily separated from the granular material contained within the receptacle.

Another object of this invention is to provide a new and improved sanitary receptacle in which the component parts thereof are assembled so as to automatically separate waste material from the granular material when the components are disassembled, and in which means are provided for converting a separator thereof into an inner receptacle capable of containing the screened granular material for facilitating reassembly of the component parts.

Yet another object of this invention is to provide a new and improved sanitary receptacle in which only the waste products are automatically separated from the granular material and the granular material itself is contained in a selective component of the receptacle for reuse thereof.

Another object of this invention is to provide a new and improved sanitary receptacle of the character described which overcomes disadvantages of prior means and methods heretofore intended to accomplish generally similar purposes.

These and other objects of this invention will be more apparent from the following drawings, detailed description and appended claims.

In the drawings:

FIGURE 1 is a perspective view, illustrating the components parts of the sanitary receptacle of this invention in exploded relationship;

FIGURE 2 is a vertical, cross-sectional view as taken substantially through the center of the receptacle of FIGURE 1 with its component parts in assembled relationship;

FIGURE 3 is a vertical, cross-sectional view, similar to FIGURE 2, and showing a component thereof in a changed, operative position;

FIGURE 4 is a vertical, cross-sectional view, similar to FIGURE 2, and illustrated as having the moved component of FIGURE 3 removed from the assembly;

FIGURE 5 is a vertical, cross-sectional view, of one receptacle and a separator element associated therewith shown in vertically exploded relationship;

FIGURE 6 is an enlarged, fragmentary, horizontal cross-sectional view as viewed substantially along the line 6—6 of FIGURE 5; and FIGURE 7 is a vertical, cross-sectional view as taken substantially along the vertical center of a modified sanitary receptacle of this invention, with parts thereof shown in elevation.

Referring in detail to the drawings, and more particularly to FIGURES 1-6, inclusive, there is shown, by way of illustration, but not of limitation, a preferred embodiment of a sanitary receptacle designed and constructed in accordance with this invention and generally designated by the numeral 10. In this embodiment, the receptacle 10 is illustrated as being adapted for use as an animal's commode for containing a quantity of granular material, such as sand, or any suitable prepared ground material which is highly absorptive for sanitizing and deodorizing the excrement, in liquid or solid form, deposited therein by the animal and which is readily serviceable for separating the excrement therefrom for disposal. The granular material is hereinafter referred to as sand for the purpose of disclosing this invention and generally referred to by the designation S.

In general, the receptacle 10 includes a rectilinear, or otherwise configurated, outer receptacle 11 of a walled construction which includes an imperforate bottom wall 12 and an integral upstanding peripheral wall 13 defining an open top 14. A second rectilinear structure 15, substantially complementary in configuration to the first receptacle is telescopingly and removably superposed to the receptacle 11. The structure 15 includes a rectilinear perforated bottom wall 16 secured to or integrally formed with an upright, imperforate peripheral wall 17 so as to define an open top 18 coincident with the open top 14. The receptacle 10 further includes a relatively-flat and relatively-flexible imperforate plate 20, of a rectilinear configuration substantially complementary to the configuration of the perforated bottom wall 16 of the structure 15, so as to be superposable thereto in a manner to cover the perforations of the floor 16 whereby, when the plate 20 is superposed to the bottom wall 16, the structure 15 is capable of containing the quantity of sand S for a purpose to be hereinafter described.

For facilitating handling of the structure 15, it is preferably provided with a pair of opposed, outwardly extending flanges 21 useable as handles whereby the receptacle may be easily and readily lifted out of the receptacle 11. Similarly, the plate 20 is preferably provided with a handle 22 comprising a laterally extending flange secured to or formed integrally with an upstanding extension 23 of the plate 20. The handle 22 preferably extends above the flange 21 so as to be accessible for the exterior of the structure 15 when superposed thereto.

The structure 15 acts as a separating means for separating or screening waste material from the quantity of granular material S, whereas the plate 20 forms a means for covering the perforations of the bottom wall 16 to adapt the structure 15 for use as a container for holding the quantity of sand S as it is being transferred from one component to another as will be hereinafter described.

In use, the receptacle 10 is assembled by superposing the container 15 to nest in the first receptacle 11 and the plate 20 is superposed over the perforated bottom 16 to close the perforations thereof, after which receptacle 10 is provided with a predetermined quantity of the sand S or other absorbent granular material. The amount of granular material is preferably approximately two or three inches which is suitable for use with animal inasmuch as animals, particularly cats, prefer a depth at which they can scratch so as to bury any waste material, such as dry or wet excrements, so as to cover the waste material as is their custom. Such waste material must be periodically removed from the granular material so as to prevent decaying thereof to the extent that the deodorizing and absorbent quality of the sand is overcome.

To separate the waste material, as best seen in FIGURE 3, the plate 20 is first removed from the receptacle 10 so as to deposit the sand on the perforated bottom wall of the container 15. For this purpose, the plate is preferably formed of a relatively flexible material for facilitating removal thereof wherein the plate may be flexed so as to be more easily slid out from under the sand.

Subsequently, by lifting and shaking the structure 15, the sand S is sifted through the perforations of the bottom wall 16 to deposit the sand on the bottom 12 of the receptacle 11 while retaining the waste products in the receptacle 15. This waste material can be then discarded while the sand is contained in the receptacle 11.

To reassemble the receptacle 10 without manual handling of the sand S, the plate 20 is replaced to cover the perforated bottom wall 16 of the receptacle 15 so as to adapt the receptacle 15 for use as a container capable of holding the sand S, after which the granular material S is poured from the receptacle 11 into the receptacle 15. When the receptacle 11 has been emptied, the receptacle 15, now containing the sand, may be then replaced within the receptacle 11 and the receptacle is ready for reuse. The plate 20 may be removed from the structure 15 or, optionally, left in its installed position underneath the sand S. In this manner, the sand S may be periodically and completely sifted for separtion of the waste products therefrom. As necessary, additional sand may be added to the receptacle 10 as sand particles which adhere to the waste products are removed therewith, to retain a desired depth of sand.

Referring in detail to FIGURE 7, there is illustrated, for example, a modified embodiment of this invention, generally referred to by the numeral 10a and more readily useable for separating cigarette butts or other similar waste products from a sanitary receptacle intended for use as an ash receptacle or spitoon. In the receptacle 10a of the instant embodiment, the receptacle is adapted to be supported within a cylindrical, or otherwise configurated, stand 30 which includes an open top 31 through which the receptacle 10a may be inserted for support and elevation thereof. The receptacle 10a generally includes a first receptacle 32 having an imperforate bottom wall 33 and a peripheral bottom wall of a configuration complementary to the interior configuration 34 of the stand 30 and a peripheral vertical wall 36 secured to or integral with the bottom wall 33. The container 32, in the instant embodiment, preferably includes an outwardly-extending peripheral flange 37 adapted to extend laterally over the upper edge of the standard 30 so as to support the receptacle 32 thereon.

The receptacle 10a further includes an inner receptacle 38 complementary in configuration to the receptacle 32 and superposable therein. The receptacle 38 includes a perforated bottom wall 39 so as to act as a separator, similar to the inner receptacle 15 of the first embodiment. The receptacle 38 further includes an annular vertical wall 41 secured to the bottom wall 39 as by welding, soldering, or the like, to support the bottom wall 39. For simplicity of manufacture, the annular wall 41 preferably includes a lower, inwardly-extending annular flange forming a shelf to which the perforated bottom wall 39 may be secured, and an upper, outwardly-extending annular flange 44 for use as a handle facilitating handling of the receptacle 38 relative to the outer receptacle 32.

A relatively-flat imperforate plate 46 having a configuration complementary to the bottom wall 39 is provided for covering the perforations of the bottom wall 39 so as to adapt the inner receptacle 38 for use as a container for containing the sand S for the same purpose as described in connection with the separator and plate of the first embodiment. Handle means 48, illustrated herein as a vertical rod 49 having a horizontal handle portion 51, is secured to the plate 46 for facilitating handling thereof.

The receptacle 10a is useable similarly to the receptacle 10 of the first embodiment, i.e., the inner receptacle 38 is superposable within the outer receptacle 30, similarly to the relationship of the components 11 and 15 of the first embodiment, and the plate 46 is superposable within the receptacle 38 for covering the perforations of the bottom wall 39 and to adapt the receptacle 38 to contain the sand S. In this condition, a predremined amount of sand S is poured into the container 38 whereby waste products, such as cigarette butts, ashes, or the like, or expectorations may be deposited in the sand S and conveniently and practicably separated from the sand S for disposal thereof.

To sift waste products from the sand S, a procedure, similar to that of the first embodiment, is applied. The plate 46 is removed by means of the handle 51 to cause the sand S to be dumped into the container 38 having a perforated bottom 39. The container 38, by means of the flange 44, may then be agitated during removal thereof from the receptacle 32 thereby, at the same time, sifting unwanted waste products from the sand S to be retained in the receptacle 38 for disposal. The receptacle 32 may then be removed from the column 30 for dumping the sand 47 back into the receptacle 38 after replacing the plate 51 to cover the perforations of the perforated bottom 39, after which the receptacle 38 may be replaced in the receptacle 32 and the sanitary receptacle 10a is ready for reuse so as to receive waste products for collection thereof and for periodic separating of the waste products.

The receptacle 10, intended for use with an animal, can be of any desired size and proportion, in proportion to the size of the animal for which it is to be used. The vertical peripheral wall 13, is preferably of a height sufficient to enable the animal to scratch and dig into the sand S without scattering the sand outwardly of the receptacle. The wall 13 is preferably 5 to 6 inches in depth whereas the sand is filled to a depth approximately half the height of the receptacle wall 13 or approximately 2½ to 3 inches. The receptacle 10a, on the other hand, may be of any desirable depth, as determined by the column 30 and the amount of waste material anticipated to be disposed of therein.

While there is herein shown and described what is conceived to be the most practical and preferred embodiments of this invention, it is recognized that departures may be made therefrom within the scope of this invention which is not limited to the details disclosed herein but is to be accorded the full scope of the claims so as to embrace any and all equivalent devices.

What is claimed as new and desired to secure by Letters Patent is:

1. A sanitary receptacle for holding a granular sand-like material to receive waste material wherein the waste material is separable from the granular material for disposal thereof, comprising:
   a walled receptacle having an imperforate bottom wall of a predetermined configuration and a peripheral vertical wall secured thereto so as to define an open top;
   perforated bottom wall means of a configuration substantially complementary to said imperforate bottom wall so as to be superposable thereto; and
   a relatively flat plate having a configuration substantially complementary to said bottom wall means so as to be superposable thereto for closing the perforations thereof, said perforated bottom wall means being superposed of said imperforated bottom wall and said plate being superposed contiguously of said perforated bottom wall means for holding said granular material out of contact with said perforated bottom wall means to prevent said waste material from plugging the perforations thereof, said plate being removable from said superposed position for permitting said perforated bottom wall means to support said granular material, said perforated bottom wall means being removable from said walled receptacle for sifting said granular material into said walled receptacle, and said plate being replaceable over said perforated bottom wall means so as to cover said perforated bottom wall means, whereby said granular material is retainable above said perforated bottom wall means when poured thereover.

2. A sanitary receptacle as defined in claim 1, including handle means on said plate facilitating removal of said plate from said second walled receptacle, said handle means including an upstanding wall secured to said plate and having a laterally extending flange integral therewith.

3. A sanitary receptacle for holding a granular, sand-like substance to receive waste material and for separation of the waste material for disposal thereof, comprising:
   a pair of walled trays having open tops, one being superposable in the other and adapted to receive a quantity of the granular material, said one of said trays having a perforate bottom wall and the other having an imperforate bottom wall, said perforate bottom of said one tray being juxtaposed to said imperforate bottom of said other tray when said trays are superposed; and
   a relatively flat, imperforate plate super-positionable into said one tray contiguously to said perforate bottom wall so as to cover the perforations thereof whereby said one tray is capable of holding said granular material out of contact with said perforate bottom wall,
   said plate being removable from said one tray whereby said granular material is siftable from said one tray into said other tray for separating waste material from said granular material for disposal thereof after which said plate is superposable into said one tray whereby said granular material is containable in said one tray prior to superposing of said one tray to said other tray.

4. A sanitary receptacle as defined in claim 3, wherein said plate is comprised of a relatively flexible material.

5. A sanitary receptacle as defined in claim 3, including an upstanding handle on said plate for facilitating removal of said plate from said second tray.

References Cited in the file of this patent
UNITED STATES PATENTS

| | | |
|---|---|---|
| 1,287,809 | Willhelm | Dec. 18, 1918 |
| 1,390,455 | McCollom | Sept. 13, 1921 |
| 2,713,321 | Keen | July 19, 1955 |
| 2,865,379 | Fernandez | Dec. 23, 1958 |
| 2,963,003 | Oberg et al. | Dec. 6, 1960 |
| 2,971,493 | Robb | Feb. 14, 1961 |